US008516246B2

(12) United States Patent
Brener et al.

(10) Patent No.: US 8,516,246 B2
(45) Date of Patent: Aug. 20, 2013

(54) NETWORK BINDING

(75) Inventors: Snir Brener, Petah Tikva (IL); Isacc Ben-Laish, Kfar Saba (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 784 days.

(21) Appl. No.: 12/537,599

(22) Filed: Aug. 7, 2009

(65) Prior Publication Data

US 2010/0037052 A1 Feb. 11, 2010

Related U.S. Application Data

(60) Provisional application No. 61/086,863, filed on Aug. 7, 2008.

(51) Int. Cl.
G06F 7/04 (2006.01)

(52) U.S. Cl.
USPC .............................................. 713/158; 726/2

(58) Field of Classification Search
None
See application file for complete search history.

(56) References Cited

U.S. PATENT DOCUMENTS

| 6,314,520 | B1* | 11/2001 | Schell et al. | 726/13 |
|---|---|---|---|---|
| 2003/0074584 | A1* | 4/2003 | Ellis | 713/201 |
| 2003/0220994 | A1* | 11/2003 | Zhu | 709/223 |
| 2004/0001008 | A1* | 1/2004 | Shuey et al. | 340/870.02 |
| 2004/0103282 | A1* | 5/2004 | Meier et al. | 713/171 |
| 2005/0113070 | A1* | 5/2005 | Okabe | 455/411 |
| 2006/0101114 | A1* | 5/2006 | Sandhu et al. | 709/203 |
| 2006/0101286 | A1* | 5/2006 | Catherman et al. | 713/193 |
| 2006/0182280 | A1* | 8/2006 | Laitinen et al. | 380/247 |
| 2006/0183500 | A1* | 8/2006 | Choi | 455/558 |
| 2007/0220253 | A1* | 9/2007 | Law | 713/168 |
| 2008/0002829 | A1* | 1/2008 | Forsberg et al. | 380/247 |
| 2008/0086620 | A1* | 4/2008 | Morris | 711/203 |
| 2010/0049981 | A1* | 2/2010 | Karaoguz et al. | 713/173 |

OTHER PUBLICATIONS

Lee (Lee et al., A New Delegation-Based Authentication Protocol for Use in Portable Communication Systems, IEEE Transactions on Wireless Communications, vol. 4, No. 1, Jan. 2005).*

* cited by examiner

*Primary Examiner* — Peter Poltorak
(74) *Attorney, Agent, or Firm* — Banner & Witcoff Ltd.

(57) ABSTRACT

In a communication network comprised of a central management entity and plurality of terminals, methods and systems for remotely binding terminals to the network and for unbinding already bind terminals when necessary. Once bind to a network, a terminal may not operate in another network, unless the two networks share a secret.

25 Claims, 4 Drawing Sheets

NETWORK BINDING

RELATED APPLICATIONS

The present application is a non-provisional of U.S. Provisional application Ser. No. 61/086,863, filed Aug. 7, 2008, entitled "Network Binding," the contents of which are incorporated herein by reference in their entirety for all purposes.

TECHNICAL FIELD

This invention relates to the field of communication networks in general and to authentication and access control.

BACKGROUND

Connecting to the Internet or to any other communication service often requires end users to acquire some equipment (sometimes referred to as customer premises equipment or CPE). This equipment often includes devices capable of receiving and transmitting information over an applicable media, such as cables, telephone wires, optic fibers, etc. Other types of such devices may be capable of wireless communication and/or satellite communication. In some cases, such equipment may be configured to support more than one technology (e.g. cellular phones, which may operate both in GSM and CDMA networks).

Services as described above are often available from several providers. The competition may drive some providers to subsidize the CPE in order to attract more subscribers. In such cases, a provider may lend the CPE, lease it for a low monthly fee or sell it at a significant discount while expecting to recover the investment in the CPE and eventually make a profit through collecting service fees over several years of providing the service. In cases where the CPE is compatible for use in networks of several providers, this economic model could work only if a provider can hold on to subscribers and prevent them from taking CPE units bought at discount and seeking service with other providers.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention include a method for remotely binding a CPE to a network, e.g., binding might not occur during manufacturing of the CPE but after the CPE is already deployed. Once bind to a network, a CPE might not be permitted to be used in another network, unless purposely being unbind prior to such transition.

In one aspect of this invention, the suggested method may be transparent to the CPE user. On one hand, the CPE user might not be required to provide any information in order to facilitate the binding of the CPE to the network. On the other hand, the CPE user may have no control over the binding procedure and therefore the CPE user might not be able to prevent the binding of the CPE to the network. Once a CPE may be bind to a network, this binding might not be bypassed through normal usage of the CPE. Any attempt to hack into the CPE and tamper with it in order to bypass the binding may often result in damaging the CPE and rendering it unusable.

In another aspect of this invention, a CPE already bind to a network may be transferred to another network (either one serviced by the same provider or one serviced by another provider with whom the first provider may have a co-operation agreement) without being unbind first, if both networks share a secret.

BRIEF DESCRIPTION OF THE DRAWINGS

Figure 1:
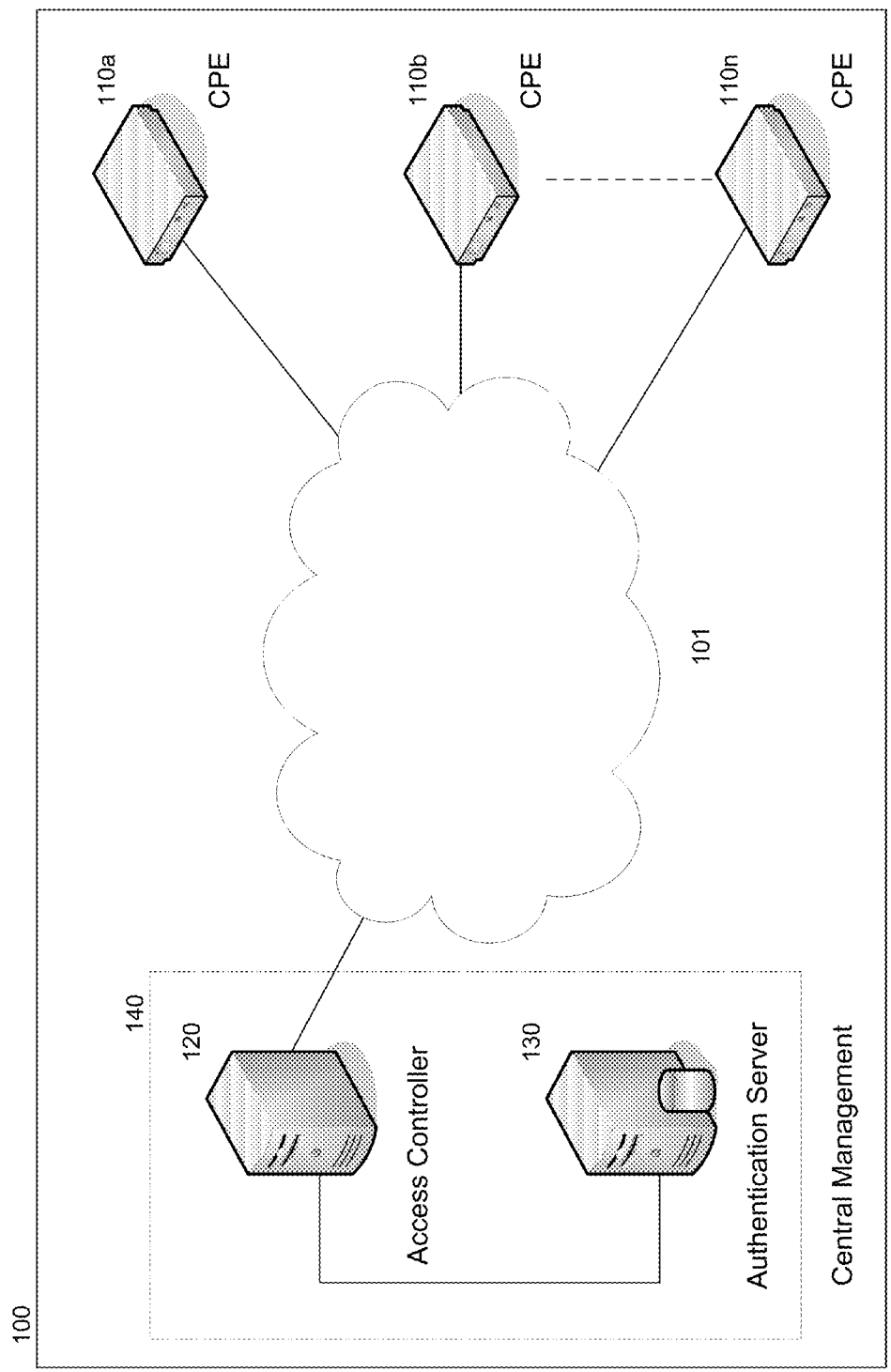

Having thus described the invention in general terms, reference will now be made to the accompanying drawings, which are not necessarily drawn to scale, and wherein:

FIG. 1 shows a possible embodiment of a communication network in accordance with some aspects of this invention.

Figure 2:
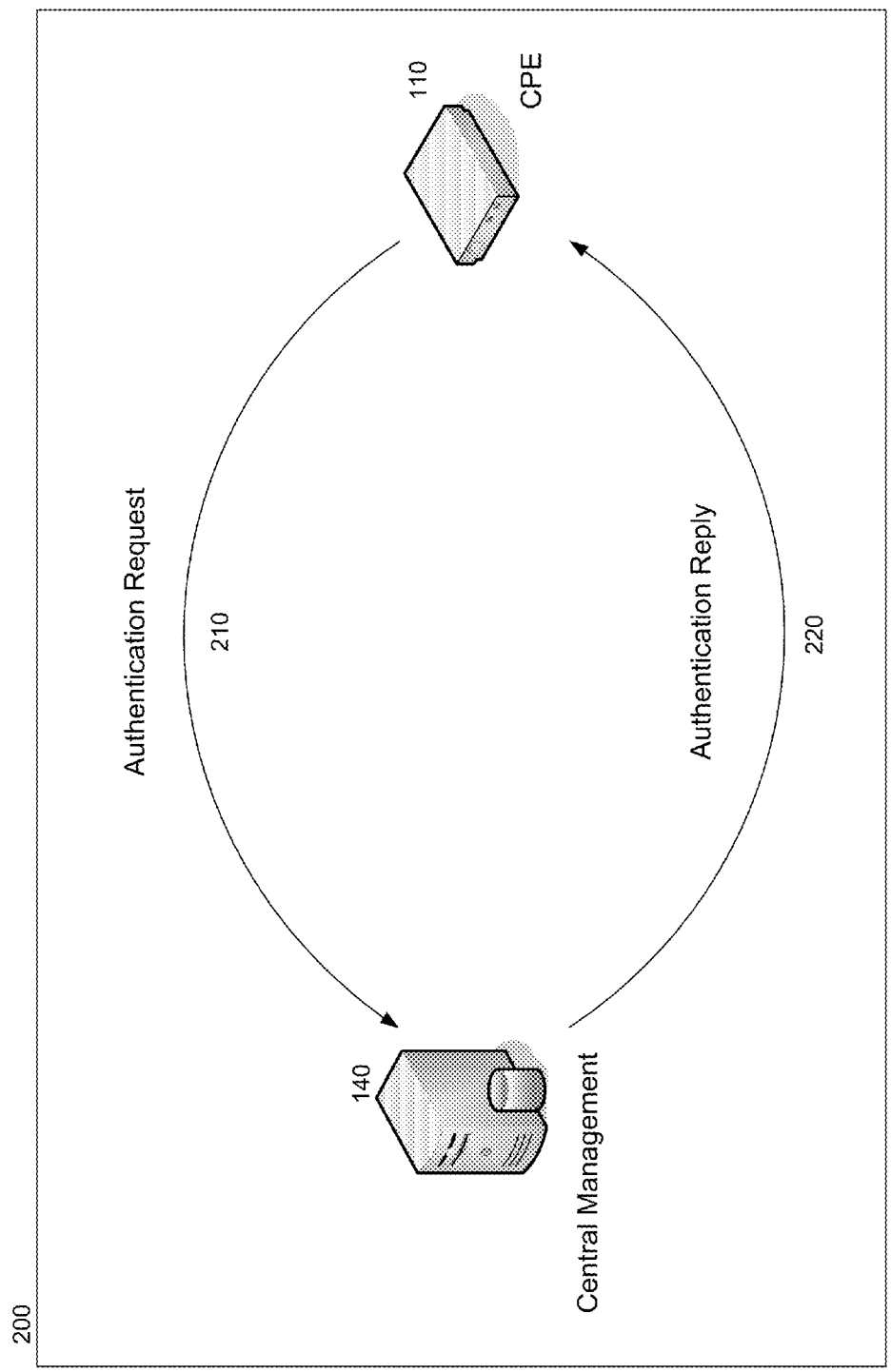

FIG. 2 shows a general diagram of an authentication procedure according to aspects of this invention.

Figure 3:
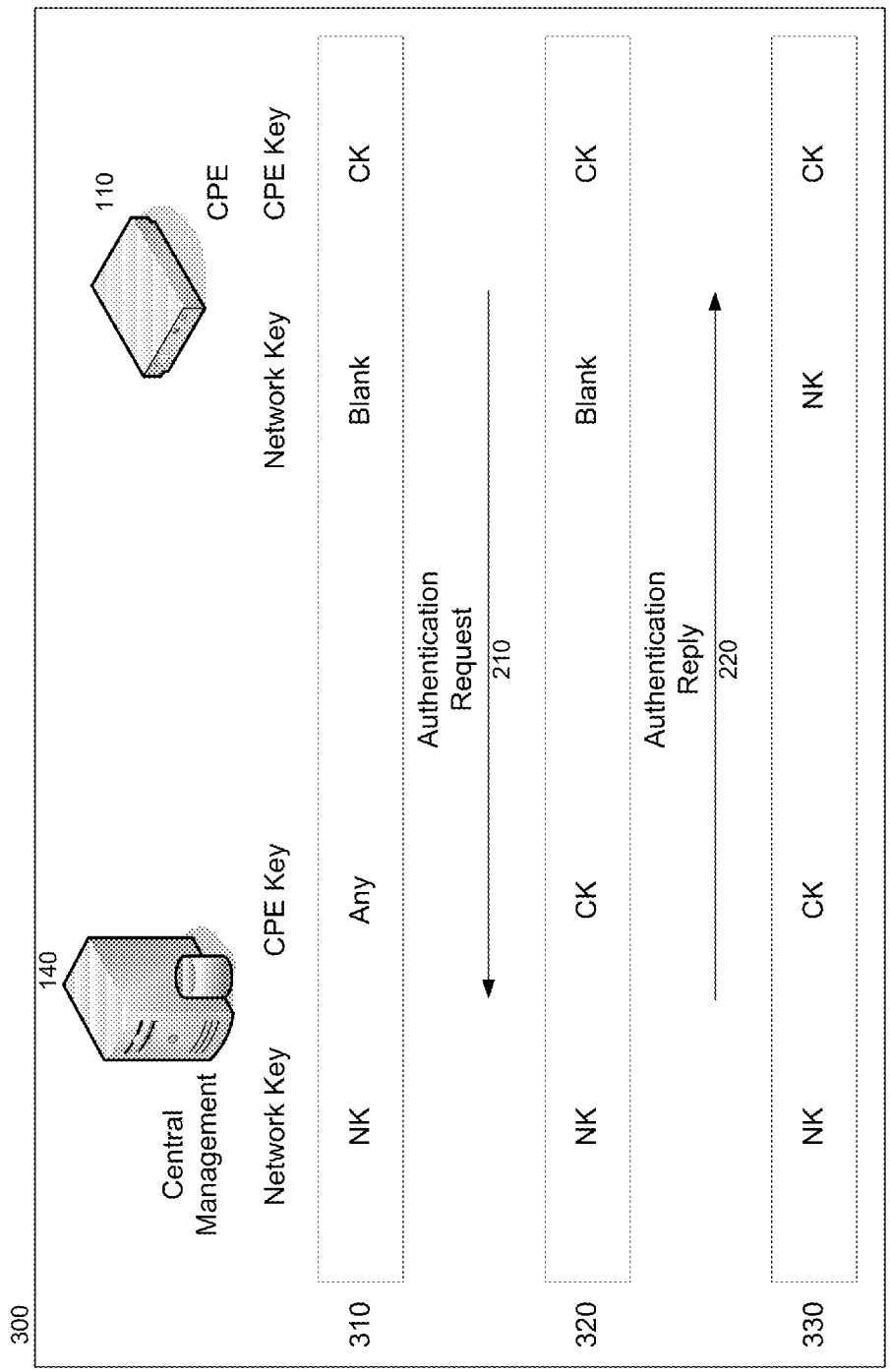

FIG. 3 shows a diagram describing a binding procedure for a CPE unit according to aspects of this invention.

Figure 4:
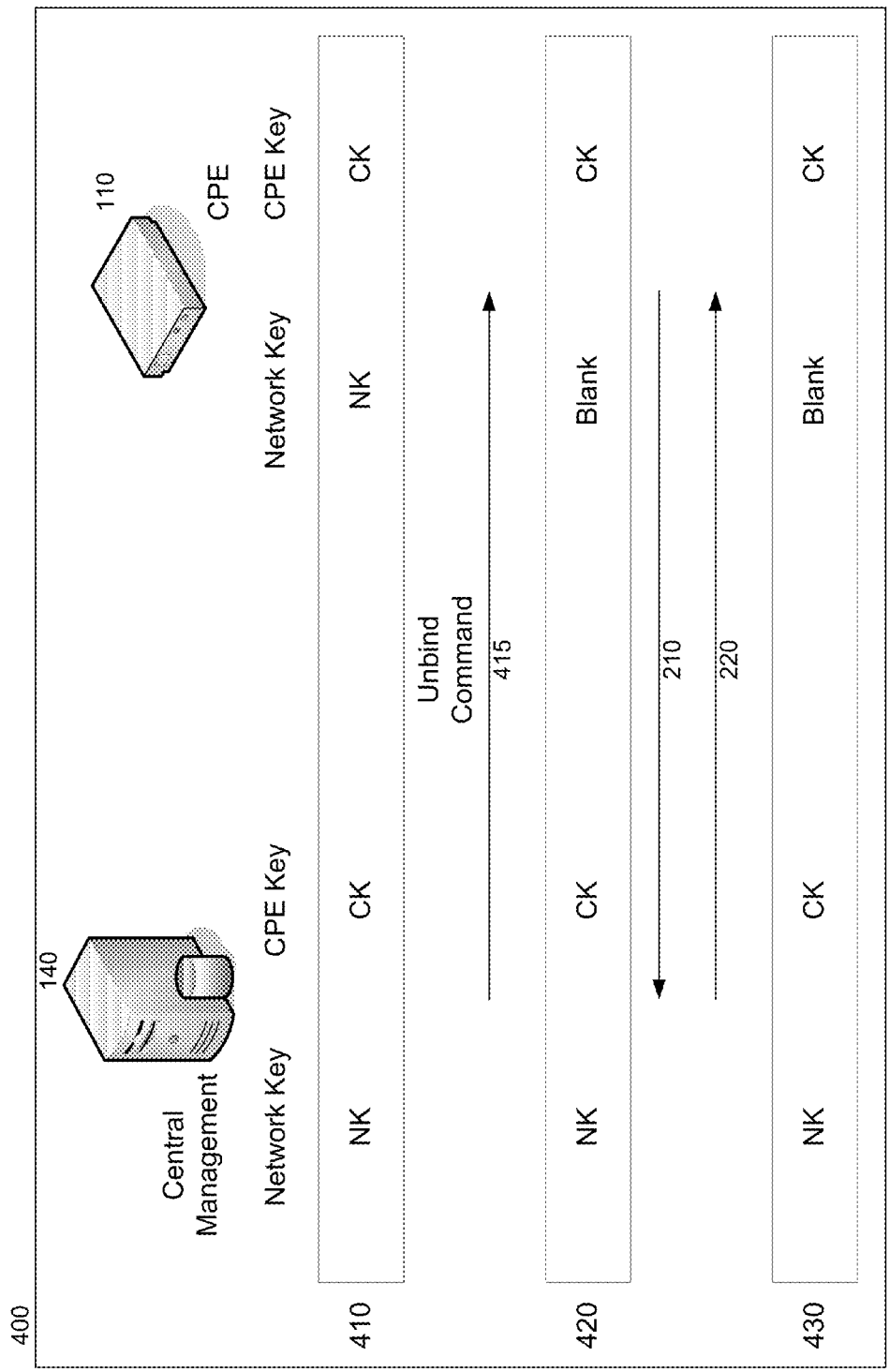

FIG. 4 shows a diagram describing an unbinding procedure according to aspects of this invention.

DETAILED DESCRIPTION

In many communication networks, an authentication procedure is being exercised whenever the end user wants to access the network. The authentication procedure may be initiated by a network access control entity, which may prompt the end user and/or the applicable CPE to provide the information required for completing the network access phase. In other embodiments, the CPE itself may initiate the authentication procedure by including the necessary authentication information in an access request sent to the access control entity. The authentication protocol used may be pre-configured in the CPE and in the access control entity or negotiated between the CPE and the access control entity on a session-by-session basis.

Once the authentication information reaches the network's access control entity, it is often referred to an authentication server. The authentication server may be integrated with the access control entity, or implemented as a separate component and configured to communicate with the access control entity using an appropriate protocol (e.g. RADIUS). When the authentication server receives the information, it may consult any one or more local or remote databases and determine whether the end user is valid and whether network access is permitted. The authentication server may then send a reply to the access control entity as per the validation results, i.e. either acknowledging the end user or rejecting the authentication attempt. In some embodiments, end user acknowledgement may also include throughput limits and other quality-of-service related information based on the properties of the end user as defined in the authentication databases.

Once receiving a reply from the authentication server, the access control entity may reply the CPE and either complete the access phase or block the CPE from accessing the network, as per the reply from the authentication server.

In some embodiments of authentication procedures, the authentication server may also validate the CPE itself. The information sent by the CPE may include one or more identifiers of the CPE itself, such as but not limited to an Ethernet MAC address, a serial number, a network identifier or any other information item, which may be used for identifying the CPE. This information may be used solely for validating the CPE or in conjunction with other information in order to also validate a user of the CPE.

In all the embodiments described above, it is possible to obtain a suitable CPE from any source, register it with a service provider and then receive service from that provider. As providers are interested in increasing their number of subscribers, it is within their interest to accept such users, even if the users are providing the CPE units themselves rather then obtaining them from the service providers. However, this cooperation between users and some service providers may hurt other service providers, who sell the CPE at a discount, as their expectation to recover their investment and make profit through collecting service fees over several years cannot be guaranteed. This is especially true if the service fees are related to the volume of traffic generated and/or received by the CPE. If the CPE is receiving service from another provider, it does not generate or receive any traffic in its original network and therefore the original network's service provider's revenues are affected. Consequently, a method is required for binding a CPE to a network and preventing its use in other networks where it may be configured to operate.

In reference to FIG. 1, a communication network 100 may be comprised of at least a plurality of CPE units 110 and a central management entity 140. In addition to other possible functions, central management entity 140 may also be configured to include an access controller 120 for communication network 100 and an authentication server 130 for at least the purpose of authenticating CPE units 110. In some embodiments, central management 140 may be configured to communicate with an external authentication server (not shown).

Furthermore, a CPE unit 110 may be comprised of a transmitter which may be configured to encode information and modulate it according to one or more coding and modulation techniques applicable to network 100 and then transmit the modulated signal over medium 101, a receiver which may be configured to receive transmissions over medium 101 demodulate and decode them according to one or more coding and modulation techniques applicable to network 100, one or more user interfaces such as Ethernet ports, serial ports, USB ports, telephony FXS ports, etc, and a processing unit which may be coupled with memory devices and configured to process user information at least for the purpose of receiving user information via one or more user interfaces and transmitting it via said transmitter and at least for the purpose of receiving user information via said receiver and transmitting it via one or more user interfaces. Where network 100 is a wireless network, CPE unit 110 may further be configured to include an appropriate antenna. The functionality of the CPE unit may be implemented into a single device or divided between several devices, which may be configured to interconnect via appropriate cables (including optical fibers) or using suitable wireless communication.

Furthermore, in communication network 100, CPE unit 110 may be configured to follow an authentication procedure whenever a CPE attempts to access the network for the first time (e.g. after power up) and perhaps also thereafter at regular intervals, which may be predetermined or configurable. In reference to FIG. 2, authentication procedure 200 may be comprised of at least the sending of an authentication request message 210 from the CPE 110 to central management entity 140 and the sending of an authentication reply message 220 from central management entity 140 to CPE 110 in response to receiving authentication request message 210.

In communication network 100, there may be two types of keys, a network key and a CPE key. At least one instance of each key type may be included in each message of authentication procedure 200. At the least, the keys may be included in the authentication request 210 and in the authentication reply 220 messages as per the above description. Though some embodiments of this invention may include more than one network key instance and more than one CPE key instance, for the sake of simplicity and without limiting the generality of the description, the rest of the description considers a single instance for each key type.

Furthermore, central management entity 140 may store network keys and CPE keys in a database, or in any other non-volatile storage that may be used for at least the purpose of storing CPE configuration and/or the central management entity's configuration. For the sake of simplicity and without limiting the generality of the description, the rest of the description considers the use of a database for storing network keys and CPE keys.

The network key may be generated by central management entity 140. Therefore the network key may be common to all the CPE units 110 in network 100. Central management entity 140 may generate a network key by hashing and/or encrypting a seed password, which may be provided by a human operator via a user interface of central management entity 140 (e.g. a graphical user interface, a text-based interface, a file of any format loaded into central management entity 140 or any other appropriate interface). In some embodiments of this invention, the seed password for the hash function and/or the encryption algorithm may also be generated by the central management entity, either using a random function or in any other practically unpredictable method. However, some aspects of this invention may be applicable only if the seed password is known to at least one human operator. In further embodiments of this invention, central management entity 140 may use more then one hash function and/or encryption algorithm for generating the network key from the seed password. Central management entity 140 may pass the seed password through more than one hash function and/or encryption algorithm where the output of one hash function or encryption algorithm may be used as the input for the next hash function or encryption algorithm.

One possible value of the network key may be designated as a blank network key, which may be used for signaling that no valid network key has been defined in the communication network. The blank network key may be a predetermined value (e.g. all binary zeroes, all binary ones or any other value) that may be represented considering the network key size (i.e. the number of bytes or bits used for storing the network key) and which central management entity 140 may not use when generating a true network key.

In some embodiments of this invention, central management entity 140 may implement one or more measures in order to protect the network key and any binding mechanism that relies on the network key from being compromised. For starts, only the network key may be saved into the central management entity's database. Central management entity 140 may destroy any knowledge of the seed password used for generating the network key as soon as computation of the network key is complete. Therefore, even if the database that may be used for storing the network key is hacked, only the hashed and/or encrypted network key may fall into the hacker's hands. Considering other measures described herein, obtaining a hashed and/or encrypted network key may not compromise the binding mechanism described herein.

Furthermore, central management entity 140 may employ measures in order to prevent a direct insertion of a network key (i.e. an already hashed and/or encrypted seed password) into its database. Hashing and/or encrypting a seed password, either user provided or otherwise generated using an unpredictable method, may be the only method for introducing a new network key and consequently storing it in the database of central management entity 140.

Furthermore, central management entity 140 may allow the network key to be replaced or erased (i.e. replaced with the blank network key) only if the order to do so is accompanied by the seed password that was used for generating the current network key. As any knowledge of the original seed password may be destroyed once the network key is computed, central management entity 140 may hash and/or encrypt the given password using the same one or more hash functions and/or encryption algorithms used for generating the current network key. Central management entity 140 may then compare the hashed and/or encrypted result with the current network key and allow replacing or erasing the current network key only if the two arguments of the comparison are indeed the same. Using a hash function and/or an encryption algorithm of good quality may insure that guessing the correct seed password or finding a different seed password that may yield the same output as the original seed password, is practically infeasible (as long as the seed password has been properly chosen in the first place, i.e. as a meaningless string of characters rather than being comprised of names, dates or other meaningful strings that may be deduced from knowing the network operator's personal background). It may be noted that this aspect of the invention may be inapplicable in embodiments where the seed password itself is also generated by central management entity 140 and remains unknown to any human operator.

In another aspect of this invention, the CPE key may be independently generated by CPE 110. CPE 110 may generate a CPE key only once during its entire lifetime. For reasons of implementation convenience, in some embodiments of this invention CPE 110 may repeat the CPE key generation mechanism every time CPE 110 is reset, though in that case the CPE key generation mechanism may yield the same CPE key as in the first time it has been activated on that CPE.

Furthermore, the CPE key generation mechanism may insure that no two CPE units, at least within the same network, have the same CPE key. In order to achieve that, the CPE key generation mechanism may use one or more unique, hardware-dependent identifiers as seeds for the key generation function, which in turn should have the property of yielding two different results for any two different inputs. Such identifiers may include the unit's Ethernet MAC address, any factory configured serial number or any other unique identifier that may be factory pre-configured into CPE unit 110 and which a reasonable CPE user may not alter or otherwise reprogram without using special means and/or apparatus for hacking into the CPE hardware.

CPE 110 may be configured with one instance of each key type, i.e. a network key and a CPE key. Upon being newly manufactured, CPE 110 may be configured with the blank network key for the purpose of signaling that CPE 110 has not yet been associated with and/or bind to any communication network. The CPE key may be factory configured or computed by CPE 110 as described above. Furthermore, central management entity 140 may be configured with a valid network key or with a blank network key and with a CPE key per each CPE unit that may be configured as part of the communication network. If CPE unit 110 has never accessed the network, the corresponding CPE key may be set to a default blank value (e.g. all binary zeroes, all binary ones or any other value), which may not represent a valid CPE key. The actual CPE key may be obtained automatically as described herein, therefore any pre-configuration of central management entity 140 in this regard is both unnecessary and undesired, as this may open an option to bypass the binding mechanism (this may become clear further herein). Moreover, considering that the CPE key may be hashed and/or encrypted using one or more seeds, where at least one of these seeds may be unknown to the network operator, the actual CPE key for any CPE unit may be at least at some point in time practically unpredictable.

Upon accessing communication network 100 and/or whenever authentication procedure 200 is repeated thereafter, CPE 110 may send authentication request message 210 that may include the currently configured network key and its preconfigured or calculated CPE key. Upon receiving authentication request message 210, central management entity 140 may compare the keys provided by CPE 110 against the corresponding keys currently configured in its database. Central management entity 140 may then authenticate CPE 110 if at least one of the two keys provided by the CPE 110 matches the corresponding key that may be configured in its database. If both keys provided by CPE 110 do not match their corresponding keys known to central management entity 140 at that time, central management entity 140 may refuse to authenticate CPE 110. In case of multiple key instances of each type, a match may be considered as having all the instances of a key type matching their corresponding values known to the central management entity.

Once central management entity 140 has decided whether CPE 110 is authenticated or not, it may send authentication reply message 220 to CPE 110, containing at least the corresponding keys known to central management entity 140 regarding CPE 110 at that time and an indication whether CPE 110 has been authenticated or not. If central management entity 140 does not authenticate it, CPE 110 may be blocked from accessing communication network 100.

In some embodiments of this invention, especially if network 100 follows a star topology and has a physical center, an entity located at the physical center of network 100 may be configured to block an unauthenticated CPE 110 from communicating with other CPE units of network 100 or with destinations outside network 100. Such entity may be configured to inspect the traffic and then to block or to discard or to otherwise refrain from forwarding any packet, frame or other data unit that may be sent by an unauthenticated CPE 110. In other embodiments, where communication network 100 does not have a center via which all traffic must be routed, or where the transmission medium 101 is an expensive shared resource (e.g. in satellite communication, cellular networks and other wireless services where the spectrum is a shared resource), blocking may be enforced by CPE 110 itself. CPE 110 may be configured to use an indication that may be included in authentication reply message 220 in order to determine whether such blocking is necessary. If so indicated, CPE 110 may completely block all outgoing traffic. In some embodiments where CPE unit 110 is installed at remote locations, CPE 110 upon detecting such indication may block only user traffic while maintaining the exchange of management traffic (e.g. status reports, telemetry, periodic authentication requests, etc). Using this method may allow a network operator to determine whether lack of user traffic exchange with CPE 110 is related to a hardware problem or to an authentication issue.

In another aspect of this invention and in reference to FIG. 3, CPE 110, which might not be bind to any network, may become bind to network 100 if network 100 has a valid network key (i.e. the configured network key is not the blank network key). As CPE 110 might not be bind, it may be configured with a blank network key (Blank) and with a CPE key (CK), as shown in step 310. In addition, step 310 shows that central management entity 140 may be configured with a valid network key (NK), while the value stored as the CPE key for CPE 110 may be of no importance (Any). CPE 110 may send authentication request message 210, containing the blank network key (Blank) and the CPE key (CK). Central management entity 140 may receive authentication request 210 and may detect that CPE 110 is not bind based on the provided network key being the blank network key. As shown in step 320, central management entity 140 may copy the provided CPE key (CK) into its database while overwriting any previous CPE key value that may have been stored for CPE 110. Following the CPE key update, central management entity 140 may send authentication reply message 220, which may include the current network key (NK, which is not the blank network key), the updated CPE key (CK) and an indication that the CPE 110 has been authenticated. CPE 110 may then receive authentication reply message 220 and examine the authentication indication. If authenticated (and since the CPE key provided in the message matches the configured CPE key), CPE 110 may overwrite the value of the configured network key (Blank) with the network key (NK) provided by central management entity 140, as shown in step 330. As CPE 110 may do so, it may become bind to network 100.

In yet another aspect of this invention, central management entity 140 may examine the keys provided by CPE 110 upon receiving authentication request message 210 from CPE 110. Central management entity 140 may perform this step regardless of the configured network key value, i.e. even if the network may have no valid network key configured. If the network key provided by CPE 110 is not the blank network key, central management entity 140 may determine that CPE 110 is bind to a network. Central management entity 140 may compare the network key and the CPE key provided in authentication request message 210 with the corresponding keys configured in its database. If both keys match, CPE 110 is authenticated and no further action is needed (except may be sending authentication reply message 220 to CPE 110). If no match is found, central management entity 140 may consider CPE 110 as bind to a network other than network 100 and therefore declare it as unauthenticated, following which CPE 110 is expected to become blocked as already described above. If only the network key matches but the CPE key does not, central management entity 140 may authenticate CPE 110 and overwrite the CPE key currently configured in its database. It may be noted that this scenario may occur if CPE 110 is transferred from another network or another part of a network and where the same network key is used by both central management entities. If only the CPE key matches but the network key does not, central management entity 140 may authenticate CPE 110 and reply with authentication reply message 220 containing the current network key, the CPE key and an authentication indication. Once CPE 110 receives the authentication reply message, it may determine that it is authenticated and therefore overwrite the old network key configuration with the new network key provided by central management entity 140. It may be noted that this scenario may occur if the network key for network 100 is changed. Also, as far as CPE 110 is concerned, this scenario is similar to the first binding scenario as shown in FIG. 3.

Therefore, from the moment CPE 110 becomes bind to network 100 and until a procedure to unbind CPE 110 is performed, CPE 110 may always send authentication request messages 210 with the network key field containing the network key of network 100. Since central management entity 140 may always compare the provided keys with their corresponding keys configured in the database, central management entity 140 may determine whether CPE 110 is authenticated or blocked due to being bind to another network.

In another aspect of this invention, CPE 110 bind to network 100 may become unbind from network 100 through a procedure involving at least the issuing of a specific command. An operator of network 100 may issue such command using an appropriate interface of central management entity 140 (e.g. graphical user interface, a command-line based interface or any other interface capable of recording such command). In some embodiments, central management entity 140 may also require a password for accepting an unbind command.

Furthermore, a bind CPE 110 may become unbind only while operating in the network it is bind to, e.g. network 100. If both keys provided by CPE 110 during its most recent authentication attempt mismatch the corresponding keys stored in the database of central management entity 140, CPE 110 may be considered as bind to another network and therefore unauthenticated. Therefore, central management entity 140 may prevent any attempt to unbind a non-authenticated CPE 110. For at least that purpose, central management entity 140 may store the result of the most recent authentication attempt (i.e. whether CPE 110 was authenticated or not) in its database, examine this information whenever an unbind command is attempted and decide whether to allow the execution of such command for CPE 110. In order for the mechanism to be complete, by default a CPE, which has never tried to authenticate, may be considered unauthenticated.

Referring to FIG. 4, CPE 110 is bind to the network as shown in step 410, as its network key has the same value (NK) as currently used by network management entity 140. Once unbind command 415 is verified and accepted (i.e. the command has been issued for an authenticated CPE 110), central management entity 140 may send it to CPE 110. Once received by CPE 110, unbind command 415 may be interpreted as an order to replace the configured network key (NK) with the blank network key (Blank), as shown in step 420. In some preferred embodiments of this invention, where CPE 110 may be configured to accept authentication reply messages 220 even when such are not expected (i.e. even if authentication request message 210 was not sent), unbind command 415 may follow the format of authentication reply message 220 and contain at least a blank network key, the appropriate CPE key and an authentication indication. Since CPE 110 may be authenticated and the provided CPE key may match the configured CPE key, CPE 110 may overwrite the configured network key with the provided blank network key and thus become unbind. Once unbind, when CPE 110 attempts to authenticate again, it may provide the blank network key and therefore any central management entity of any network, which may be configured according to the aspects of this invention, may authenticate CPE 110 and bind it.

In yet another embodiment of this invention, CPE 110 may repeat the authentication procedure (i.e. send authentication request message 210 and receive authentication replay message 220) at regular intervals (e.g. once a day or every several hours), as shown in FIG. 4. Therefore, once a command to unbind CPE 110 is executed, CPE 110 might bind again as soon as the authentication procedure is repeated, which may be at any time, since the unbind procedure may not be synchronized to the authentication procedure in any way. In order to prevent a situation where CPE 110 is bind while the network operator believes that it is unbind (since a command to unbind it has been successfully executed), the unbind procedure may include a mechanism that disables further binding of CPE 110 until CPE 110 is configured to bind again. Unbind command 415 may follow the format of authentication reply message 220 (as suggested above) and further include an additional binding prohibition indicator. Once CPE 110 recognizes this indicator in an authentication reply message 220, where the CPE is authenticated, the provided CPE key matches the configured CPE key and the network key is the blank network key, CPE 110 may become unbind and mark that further binding is prohibited until otherwise instructed by central management entity 140 or until CPE 110 is reset. Once the authentication procedure is repeated, though central management entity 140 may send a valid network key, CPE 110 may ignore the provided network key, as shown in step 430 of FIG. 4. CPE 110 may not overwrite the configured network key (i.e. the blank network key) with the provided network key and thus remain unbind.

In yet another aspect of this invention, all CPE units in a network may become unbind over a period of time without the need for explicitly issuing an unbind command for each CPE. As stated above, in some embodiments an operator may change or erase the network key (i.e. replace the network key with another valid network key or with the blank network key respectively). If the network key is erased, CPE 110 upon repeating the authentication procedure may detect a valid change in network key and therefore replace the configured network key with the provided network key, which in that case is the blank network key. Except for the bind prohibition indication, which may not exist in this case, this scenario is equivalent to the one occurring upon the issue of an unbind command. Therefore, erasing the network key at central management entity 140 may unbind all CPE units over a period of time that equals the longest interval between repetitions of the authentication procedure by any CPE unit.

In one possible embodiment, this invention may be applied to a satellite communication network comprised of a central hub and a plurality of remote terminals (e.g. VSATs). In addition to means for at least transmitting a forward signal, receiving return signals, allocating bandwidth to remote terminals and processing traffic, the central hub may further include a network management entity. This network management entity may further include an authentication server or be configured to communicate with an authentication server, for at least the purpose of authenticating the remote terminals.

Furthermore, in this satellite communication network, the network management entity may be configured to use the methods described above in reference to the central management entity, and any VSAT may be configured to use the methods described above in reference to the CPE.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. A method, comprising:
receiving, at a management entity, an authentication request message from a customer premises equipment unit (CPE unit), the authentication request message including a network key having a first network key value and a customer premises equipment key (CPE key);
authenticating the CPE unit based on the network key and the CPE key; and
transmitting an authentication reply message to the CPE unit, the authentication reply message including the network key having a second network key value and the CPE key, the second network key value identifying a network,
wherein the CPE unit is bound to communicating with the network after receiving the network key having the second network key value such that the CPE unit is prohibited from being authenticated with another network.

2. The method of claim 1, wherein at least one of the network key and the CPE key include multiple sub-keys.

3. The method of claim 1, wherein the management entity generates the network key having the second network key value by either hashing or encrypting a seed password, and wherein the seed password is either provided by a human operator or randomly generated.

4. The method of claim 3, where the management entity generates the network key by using multiple hash-functions or multiple encryption algorithms or any combination of one or more hash-functions and one or more encryption algorithms.

5. The method of claim 1, wherein the network key including a predetermined value is used at least for the purpose of indicating that:
a CPE unit is not bound to any network; and
network binding is not used in a network.

6. The method of claim 1, wherein the CPE key is either factory preconfigured into the CPE unit or generated by the CPE unit once during its entire lifetime.

7. The method of claim 6, wherein an algorithm used for generating the CPE key is configured to produce a unique CPE key for the CPE unit within the network.

8. The method of claim 7, where a MAC address of the CPE unit, a factory configured serial number of the CPE unit, or any other unique identifier that may be factory configured into the CPE unit, or any combination of the above identifiers are used as one or more seeds for the CPE key generation algorithm.

9. The method of claim 1, further comprising:
upon receiving said authentication request message, comparing the received first network key value and a CPE key value of the CPE key with a known network key value and a known CPE key value, respectively, wherein the known network key value and known CPE key value are stored in memory accessible by the management entity; and
authenticating the CPE unit that sent the authentication request message if at least one of the first network key value and the CPE key value match the known network key value and known CPE key value, respectively, wherein the authentication reply message further includes an indicator field set according to a result of the authentication.

10. The method of claim 9, wherein the indicator field includes a first field indicating that the CPE unit is not authenticated and a second field instructing the CPE unit to block all traffic from being exchanged through it.

11. The method of claim 9, wherein the indicator field includes a first field indicating that the CPE unit is not authenticated and a second field instructing the CPE unit to block only user traffic and continue to exchange network management traffic.

12. The method of claim 9, wherein the indicator field indicates that the CPE unit is not authenticated and instructs the CPE unit to block traffic.

13. The method of claim 9, further comprising the following steps:
upon receiving the authentication request message from the CPE unit, detecting whether the first network key value equals a predetermined value; and
overwriting the known CPE key value with the CPE key value included in the CPE key of the received authentication request message if the first network key value equals the predetermined value, the known network key value is other than the predetermined value, and the CPE unit is authenticated.

14. The method of claim 1, further comprising a step of issuing an unbind command from the management entity to the CPE unit to unbind the CPE unit from the network.

15. The method of claim 14, wherein issuing the unbind command includes providing a password, and wherein the management entity issues unbind commands only to authenticated CPE units.

16. The method of claim 14, wherein:
the authentication reply message includes the unbind command.

17. The method of claim 1, wherein the management entity comprises an authentication server, is configured to communicate with an external authentication server, or both.

18. The method of claim 1, wherein the network includes a wireless network, and wherein one or more CPE units are coupled with an antennas.

19. The method of claim 1, wherein the CPE unit comprises one or more devices, wherein the one or more devices making up the CPE unit are configured to interconnect using cables, optical fibers, wireless communication, or any combination thereof.

20. The method of claim 1, wherein:
the network is a satellite communication network comprised of at least a central hub and a plurality of remote terminals, including CPE units; and
the central hub includes the management entity, which further includes an authentication server or is configured to communicate with an authentication server to authenticate the remote terminals.

21. A management entity, comprising:
a control unit configured to:
receive an authentication request message from a customer premises equipment unit (CPE unit), the authentication request message including a network key having a first network key value and a customer premises equipment key (CPE key);
authenticate the CPE unit based on the network key and the CPE key; and
transmit an authentication reply message to the CPE unit, the authentication reply message including the network key having a second network key value and the CPE key, the second network key value identifying a network,
wherein the CPE unit is bound to communicating with the network after receiving the network key having the second network key value such that the CPE unit is prohibited from being authenticated with another network.

22. The management entity of claim 21, wherein the control unit is further configured to:
upon receiving said authentication request message, compare the first network key value and a CPE key value of the CPE key with a known network key value and a known CPE key value, respectively, wherein the known network key value and known CPE key value are stored in memory accessible by the management entity; and
authenticate the CPE unit that sent the authentication request message if at least one of the first network key value and the CPE key value match the known network key value and known CPE key value, respectively, wherein the authentication reply message further includes an indicator field set according to a result of the authentication.

23. A method, comprising:
transmitting an authentication request message from a customer premises equipment unit (CPE unit) to a management entity, the authentication request message including a network key having a first network key value and a customer premises equipment key (CPE key);
receiving an authentication reply message from the management entity, the authentication reply message including the network key having a second network key value and the CPE key, the second network key value identifying a network; and
binding the CPE unit to communicate with the network after receiving the network key having the second network key value such that the CPE unit is prohibited from being authenticated with another network.

24. The method of claim 23, further comprising:
storing the first network key value for the network key and storing a CPE key value for the CPE key; and
overwriting the first network key value for the network key with the second network key value when the CPE unit is authenticated with the network.

25. The method of claim 23, wherein the CPE unit is configured to receive unsolicited authentication reply messages.

* * * * *